F. H. & F. R. FLOUNDERS.
MACHINE FOR SHAKING CANNED GOODS.
APPLICATION FILED FEB. 19, 1910.

965,802.

Patented July 26, 1910.

2 SHEETS—SHEET 1.

Witnesses
Edwin L. Bradford
G. Ferdinand Vogt

Inventors
Frederick H. Flounders
Frank R. Flounders
By Mann & Co.
Attorneys

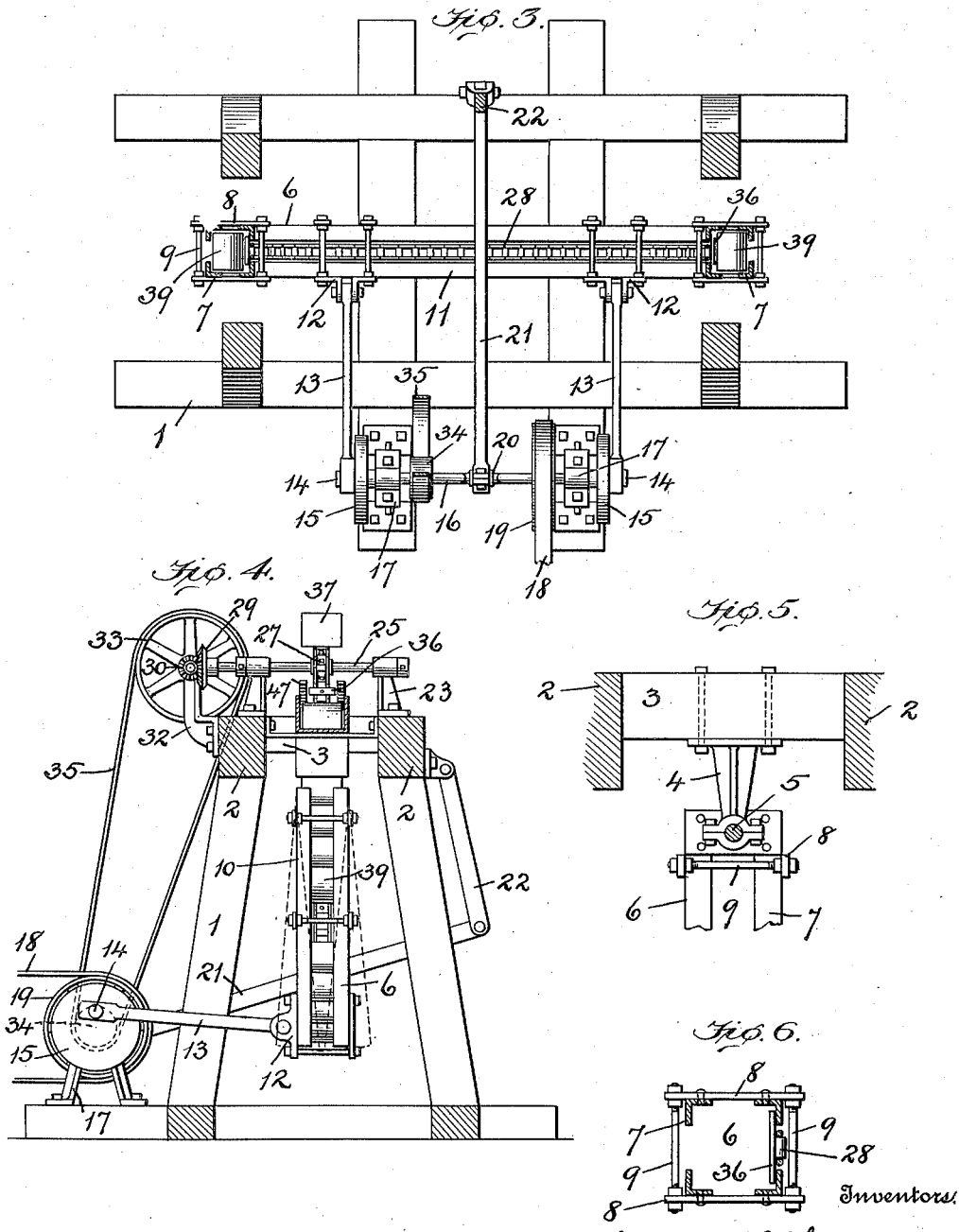

UNITED STATES PATENT OFFICE.

FREDERICK H. FLOUNDERS AND FRANK R. FLOUNDERS, OF RIDGELY, MARYLAND.

MACHINE FOR SHAKING CANNED GOODS.

965,802. Specification of Letters Patent. Patented July 26, 1910.

Application filed February 19, 1910. Serial No. 544,911.

*To all whom it may concern:*

Be it known that we, FREDERICK H. FLOUNDERS and FRANK R. FLOUNDERS, citizens of the United States, residing at Ridgely, in the county of Caroline and State of Maryland, have invented certain new and useful Improvements in Machines for Shaking Canned Goods, of which the following is a specification.

This invention relates to a machine for shaking canned goods and has among its objects to provide a machine whereby the cans containing the goods, sealed and ready for labeling or for shipment, may be passed through the machine and while traveling or moving forward be given a motion that will shake and agitate the contents so as to thoroughly mix the same.

The invention is particularly adapted for shaking canned corn, milk, cream or other substances wherein lighter portions thereof are liable to separate from the heavier portions and thus present an unsightly appearance if emptied from the cans in that condition.

Another object is to provide a simple and inexpensive machine whereby the canned goods may be revolved while passing therethrough and simultaneously with their revolution be given a sufficient violent longitudinal movement that will thoroughly mix the contents.

With these and other objects in view the accompanying drawings illustrate the invention in which,—

Figure 1:
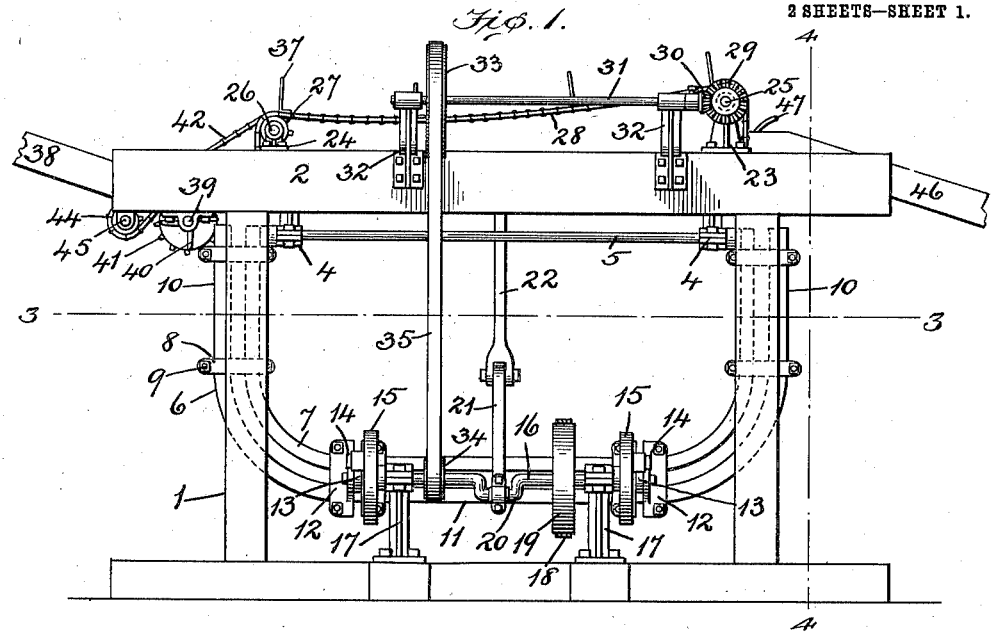
Figure 2:
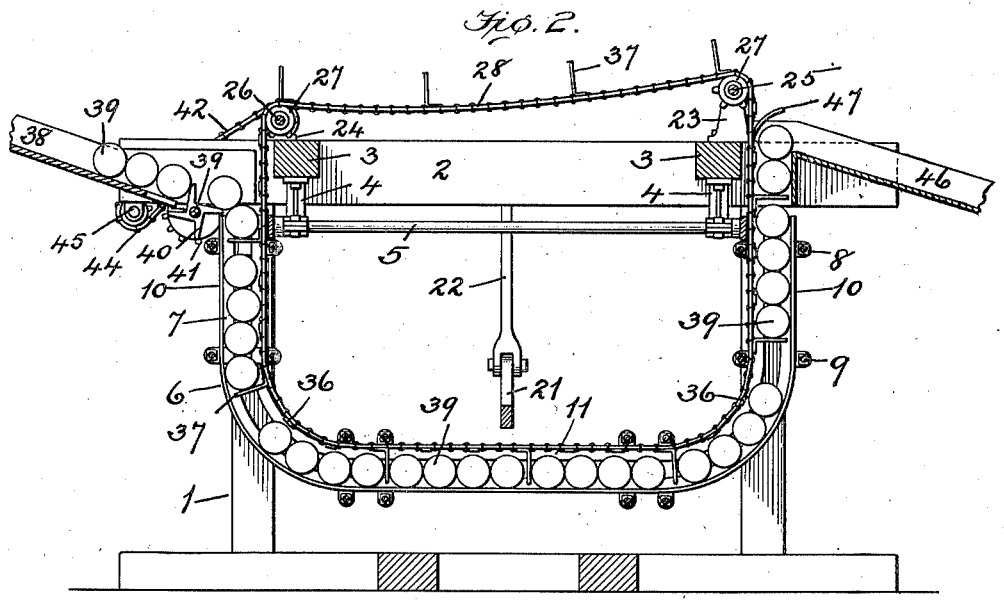
Figure 7:
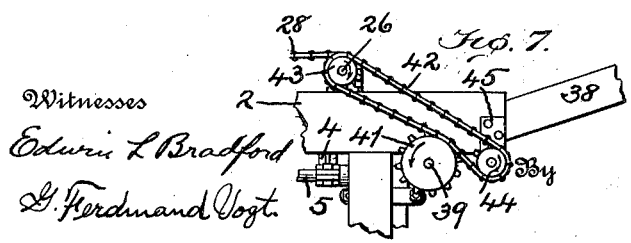

Figure 1 is a side elevation of the machine. Fig. 2, a central vertical section thereof. Fig. 3, a horizontal section of the same, the section being taken on the line 3—3 of Fig. 1. Fig. 4, is a vertical cross-section through the ends of the frame and an end elevation of the machine proper,—the section being taken on the line 4—4 of Fig. 1. Fig. 5, is an enlarged detail at the inner side of one of the pendent hangers which sustain the swinging chute or trackway. Fig. 6, is a cross-sectional detail through one of the vertical ends of the chute or trackway, and Fig. 7, is a detail side elevation of the feed in end of the machine.

Referring to the drawings by numerals, 1, designates a suitable frame structure having spaced-apart parallel supports, 2, at the top, and horizontal cross-wise supports, 3, which connect said parallel supports. Shaft hangers or brackets, 4, are secured to and depend from the supports, 3, and sustain a horizontal bar or rod, 5, the ends of which latter project beyond said hangers or brackets. A chute or trackway, 6, is pendently sustained from the opposite ends of the bar or rod, 5, so that it may be swung back and forth with the rod as the pivot, as will presently be explained.

The chute or trackway may be of any preferred construction but in the present instance comprises a plurality of angle bars, 7, secured in spaced-apart positions with respect to each other by means of cross-plates, 8, and bolts, 9, whereby to provide a passage, chute or way through which the filled cans may be propelled or conveyed. In the present instance the chute or way has substantially upright ends, 10, and a horizontal intermediate portion, 11, which is contiguous with said ends. This intermediate portion of the chute or way is provided with brackets, 12, which are rigidly attached thereto adjacent opposite ends thereof. Suitable connecting rods, 13, have one end pivotally engaging the said brackets, while their other ends engage cranks, 14, carried on rotary heads, 15, that are mounted on and are revolved with a horizontal shaft, 16. This shaft, 16, may be a part of an engine or it may be sustained in suitable bearings, 17, and driven by an engine in any suitable way, such for example as by means of a belt, 18, and pulley, 19, but in any event the revolution of the rotary heads, 15, will impart a reciprocating movement to the connecting rods, 13, and thus swing the trackway or chute back and forth rapidly, as indicated by broken lines in Fig. 4.

In practice we have found it desirable to provide a counterbalance of some form to overcome the tendency of rotary heads to turn faster when swinging the chute toward the horizontal shaft, 16, than when swinging it away from said shaft and we have found that by providing a central crank, 20, in said shaft, 16, and connecting one end of a metal bar, 21, thereto, while the other end of said bar is pivotally sustained from a lever, 22, that depends from a suitable support, the rotary motion of the shaft, 16, is very much more uniform.

The parallel top supports, 2, of the frame sustain two pairs of bracket bearings, 23, and, 24, respectively,—one pair of bearings being located at one end, and the other pair at the opposite end of the supports. Horizontal shafts, 25, and, 26, respectively are sustained in said bracket bearings, and suitable sprocket wheels, 27, are mounted on said shafts so as to sustain a sprocket chain, 28. One end of the shaft, 25, carries a gear, 29, which meshes with and is driven by a pinion, 30, on a driving shaft, 31, which is sustained by suitable bearings, 32, at the upper side of the machine. A pulley, 33, is carried on shaft, 31, and another pulley, 34, is carried on the lower shaft, 16, while a belt, 35, is driven by pulley, 34, and thus operates pulley, 33, and shaft, 31.

It will be noted that the positions of the sprocket wheels, 27, are such that those portions of the chain, 28, that extend vertical therefrom will pass down into the upright ends, 10, of the chute or trackway so that said chain may readily pass down into one of said ends then through the intermediate portion and up through the other end and finally over the two spaced-apart sprocket wheels and thus complete its endless circuit. This endless chain, 28, is provided with a plurality of cross-plates, 36, which span the gap between the angle plates at the inner side of the chute or trackway and by contact with said angle plates keep the chain in the chute as it is drawn therethrough. The chain is also provided with a plurality of flights or plates, 37, which extend laterally therefrom at spaced-apart intervals and which pass through the chute as the chain makes its endless circuit for a purpose presently to be explained.

In order to feed the filled cans, 39, with regularity we have provided at the feed end of the machine an escapement device whereby the cans may be rolled one at a time into the chute or trackway and deposited in groups on the flights, 37, of the chain. By reference to Figs. 1, 2 and 7 it will be seen that an inclined feed chute, 38, is provided at the feed-end of the machine and at its lower end the machine carries a horizontal shaft, 39, on which a star or feed wheel, 40, is mounted. One end of this shaft, 39, carries a sprocket wheel, 41, which is driven by a chain, 42, that travels in an inclined position from a driving sprocket, 43, on shaft, 26, to and around another sprocket 44, that is sustained by a bracket, 45, at the side of the machine. As the filled cans roll down the chute, 38, they are held in check by the star or feed wheel and only enter the feed end of the chute or trackway as fast as the feed wheel will allow them to pass whereupon they are deposited in groups on the flights, 37, of the chain. It will thus be seen that as the chain advances the filled cans are lowered through one upright end of the chute or trackway, then conveyed through the intermediate portion of the chute or trackway and up through the other upright end thereof to a point of discharge. During the passage of the filled cans through the chute or way the latter is swung back and forth in a comparatively violent manner or sufficiently so to thoroughly agitate and shake the contents of the cans by a longitudinal movement of the cans, and as the cans are revolving while they are subject to the longitudinal movement the contents is turned over and thrown from one end to the other of the can and thereby thoroughly mixed.

At the discharge end the machine is provided with a discharge chute, 46, onto which the cans roll after they pass out of the chute or trackway. To facilitate this operation we preferably provide curved plates, 47, at said discharge point to contact with the ends of the cans and push them off from the chain onto the discharge chute.

Having thus described our invention what we claim and desire to secure by Letters Patent is,—

1. In a machine for shaking or agitating filled cans the combination with means for advancing the filled cans and means for moving the cans longitudinally first in one direction and then another while they are advancing.

2. In a machine for shaking or agitating filled cans the combination with a conveying means having a continuous forward movement to advance the cans and means for moving the conveying means crosswise of and during its forward movement first in one direction and then another whereby to throw the cans back and forth in an endwise direction while they are moving forward.

3. In a machine for shaking or agitating filled cans the combination with a guideway for retaining the cans, of a conveyer traveling through the guideway and means for moving both guideway and conveyer back and forth while the conveyer is advancing the filled cans through the guideway.

4. In a machine for shaking or agitating canned goods the combination with a pivotally-sustained guideway through which the filled cans travel and means for swinging the guideway back and forth.

5. In a machine for shaking or agitating canned goods the combination with a pivotally-sustained guideway, an endless conveyer traveling through said guideway and means for moving the guideway laterally.

6. In a machine for shaking or agitating canned goods the combination with a pendent guideway, of means for feeding cans into one end of the guideway; means for advancing the cans through the pendent guideway and means for swinging the guideway back and forth as the cans are advanced therethrough.

7. In a machine for shaking or agitating canned goods the combination with a guideway having upright ends and an intermediate portion, of means for pivotally sustaining the guideway adjacent its ends; a conveyer traveling through the guideway and means for swinging the guideway back and forth.

8. In a machine for shaking or agitating canned goods the combination with a guideway having upright ends and an intermediate portion, of means for pivotally sustaining the guideway adjacent its ends; a conveyer traveling through the guideway; means for feeding filled cans adjacent one pivoted end of the guideway and means connecting the guideway at the intermediate portion for swinging the same.

9. In a machine for shaking or agitating canned goods the combination with a guideway having upright ends and an intermediate portion connecting said ends, of means for pivotally sustaining said guideway from said ends; means for directing filled cans from the other upright end of the guideway; a conveyer moving through the guideway for advancing the filled cans, and means for swinging the guideway.

In testimony whereof we affix our signatures in presence of two witnesses.

FREDERICK H. FLOUNDERS.
FRANK R. FLOUNDERS.

Witnesses:
Louis A. Fallowfield,
Wm. H. Simpson.